May 4, 1965　　　C. B. BRAHM ET AL　　　3,181,353
POWER REMAINING INDICATOR

Filed Feb. 4, 1963　　　　　　　　　　　　　2 Sheets-Sheet 1

INVENTORS
CHARLES B. BRAHM
RICHARD F. GAMBLE
BY
　　ATTORNEY

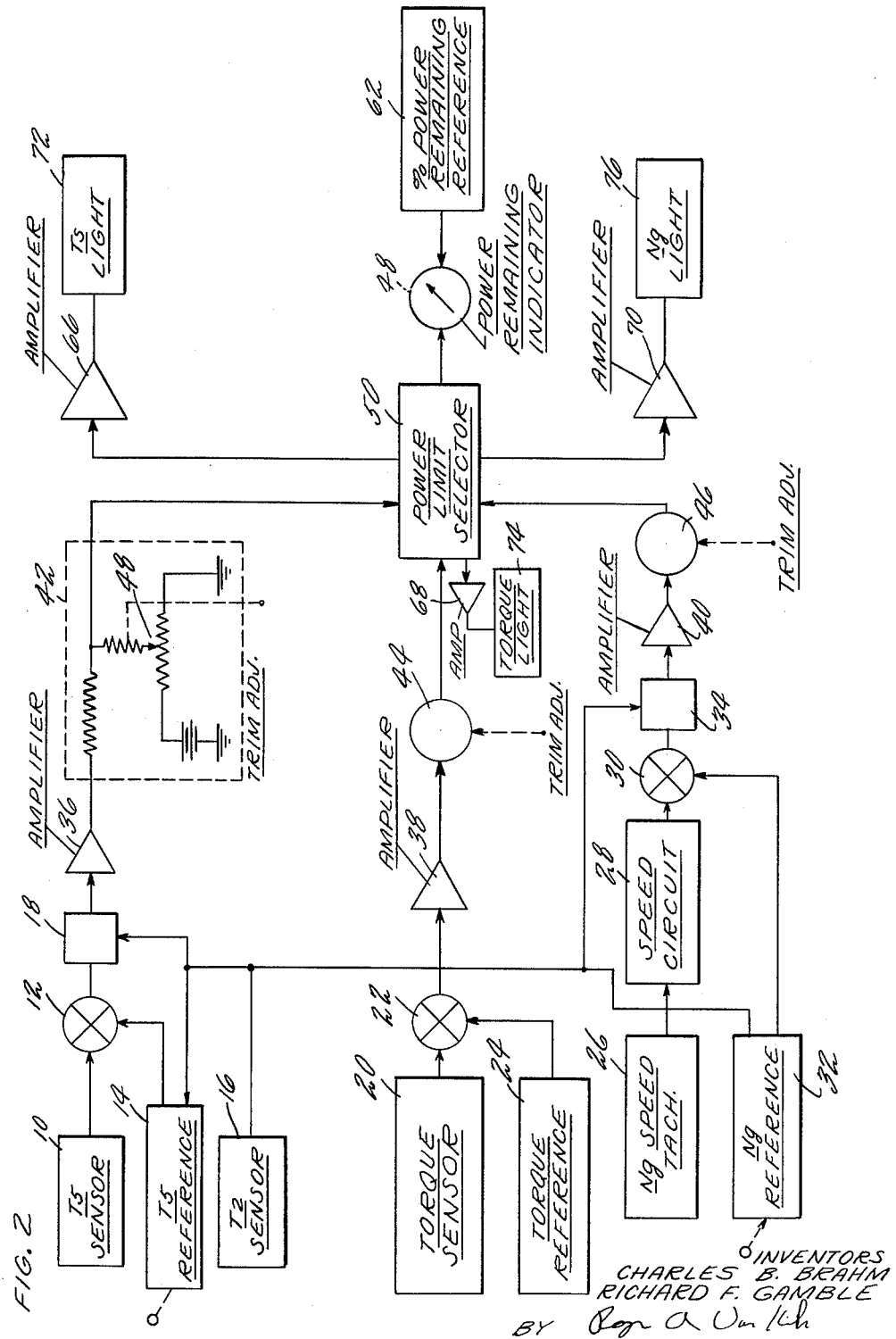

United States Patent Office
3,181,353
Patented May 4, 1965

3,181,353
POWER REMAINING INDICATOR
Charles B. Brahm, Ellington, and Richard F. Gamble, Simsbury, Conn., assignors to United Aircraft Corporation, East Hartford, Conn., a corporation of Delaware
Filed Feb. 4, 1963, Ser. No. 255,815
19 Claims. (Cl. 73—116)

Our invention relates to a power remaining computer for a gas generator. More particularly, our invention is directed to a device which permits the pilot of a turbine-powered craft to instantaneously ascertain the percent power remaining in his engine.

Since the inception of turbine-power plants for use in powering helicopters and other craft, there has been a need for an indication of power which a pilot can use as he does manifold pressure in a piston-powered craft. In operating the gas turbine power plant, the pilot must avoid exceeding the prescribed limits for engine r.p.m., temperature of the discharge from the gas generator portion of the power plant and output shaft torque. Further, if these parameters are limited by other devices, such as fuel control, the pilot must know the available margin of the individual limit at the instant of making a decision for power addition. For example, in executing a maneuver such as landing a helicopter on a pitching deck, the pilot must be able to instantly ascertain that if he pulls up on the collective stick he will get the power required to lift his craft to a safe position should a wave suddenly lift the ship.

Our invention fulfills the above discussed need by providing a computer and associated indicating instrument which will furnish the pilot of a turbine-powered craft with instantaneous information concerning the available power margin remaining in his engine and which of the engine parameters is limiting the available power.

It is therefore an object of our invention to provide an indication of available power remaining in a gas generator.

It is another object of our invention to provide an indication of which one of a plurality of engine parameters is at any instant limiting power available.

These and other objects of our invention are accomplished by a power remaining computer and indicator system which senses power limiting engine parameters and then converts the signals corresponding to these parameters into terms of engine power. The signal corresponding to the parameter which is limiting the power remaining is selected and compared to a reference signal proportional to maximum available power. The difference between this reference and the selected signal is applied to an indicating instrument which is calibrated in terms of percent power remaining. Simultaneously, an indication is provided as to which of the sensed parameters is at that instant limiting the power available.

Our invention may be better understood and its numerous advantages will become apparent to those skilled in the art by reference to the accompanying drawing wherein like reference numerals apply to like elements in the various figures and in which:

FIGURE 2 is a block diagram of the power remaining computer which comprises our invention.

Figure 1:
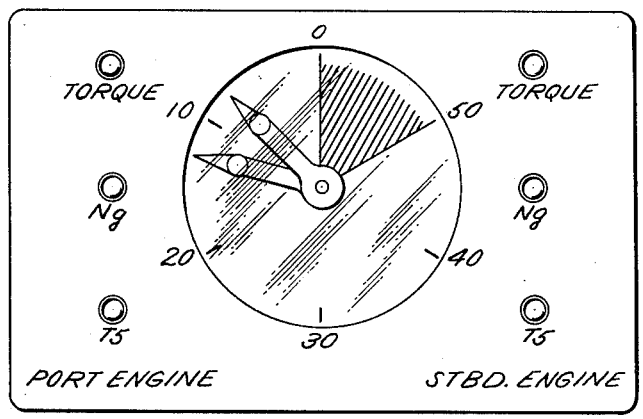
FIGURE 1 is a representation of how the indicator of our invention might be arranged when the invention is used on a twin-engine craft.

While not limited thereto, our invention will be described in connection with computing and indicating the power remaining in a turbine engine consisting of a gas generator driving a free turbine which is in turn connected to a load, such as the rotor of a helicopter, through appropriate gearing. The instrument utilizes T5, gas generator discharge temperature; T2, gas generator inlet temperature; $N_g$, gas generator turbine speed; and torque developed by the free turbine to determine the percent power remaining in the engine. As shown in FIGURE 1, the scale of the indicator displays the percent power remaining from 50% to 0 power remaining. The indicator shown in FIGURE 1 is designed for use with a twin-engine craft and thus comprises a two movement meter thereby providing a single display showing the power remaining in each engine.

From the block diagram, FIGURE 2, the operation of the power remaining computer can be seen. The T5 channel of the instrument receives its input signal from a free turbine inlet temperature sensor 10 which may be a thermocouple. This T5 or gas generator discharge temperature signal is then compared in a difference circuit 12 with a T5 reference signal from reference voltage source 14. The T5 reference voltage is initially adjusted to be equal to the actual T5 signal from sensor 10 at the maximum permissible tailpipe temperature. However, since the relationship between power remaining and maximum permissible gas generator discharge temperature varies to some extent with the gas generator compressor inlet temperature, T2, the accuracy of the power remaining computer may be significantly improved by providing T2 compensation. That is, the slope of the T5 vs. power remaining curve plotted for a gas generator is different for each value of T2. Also, the maximum permissible value of T5 varies, although to a relatively lesser degree than the slope of the power remaining curve, with T2. Thus, T2 compensation may be accomplished by one or both of two methods. First, the T5 reference may be shifted in accordance with T2. For this purpose, a compressor inlet temperature sensor 16 is provided. Sensor 16 may take the form of a plurality of temperature sensitive resistors. Since the T5 reference voltage is preferably established across one leg of a bridge circuit, this voltage may be modified in accordance with T2 by connecting one of the temperature sensitive resistors in the T2 sensor in the bridge. The output from difference circuit 12 in thus zero volts at the maximum permissible gas generator discharge temperature for the existing conditions and increases as the difference between maximum and actual T5 increases. This difference voltage is applied to a multiplication circuit 18. The function of circuit 18 is to provide the second and more important of the modes of T2 compensation mentioned above. By multiplying the T5 difference voltage from circuit 12 by the T2 signal, the slope of this voltage is caused to vary with T2. Thus, compensation for variations in the slope of the T5 vs. power remaining curve with T2 fluctuations is achieved.

Torque developed by the free turbine is sensed by sensor 20 which may be any one of a number of commercially available torque sensing devices which provide an electrical output signal proportional to torque. The output of torque sensor 20 is compared in difference circuit 22 with a torque reference voltage provided by reference voltage source 24. As with the T5 channel, the torque reference voltage is set so that at maximum permissible torque the difference voltage from circuit 22 is zero. As the torque decreases from maximum, the difference voltage will increase.

The $N_g$ or gas generator speed channel is driven by a signal from the $N_g$ tachometer 26. The tachometer signal is fed into a speed circuit 28. Speed circuit 28 senses a change in tachometer frequency and puts out a D.C. voltage proportional to frequency which in turn is proportional to speed. A circuit with these characteristics is disclosed in copending application No. 54,073, filed September 6, 1960, by Henry E. Martin, entitled Speed Responsive Control System and assigned the same assignee as the present invention. The output of speed circuit 28 is applied to a difference circuit 30 where it is compared to a pre-set $N_g$ reference voltage from $N_g$ reference voltage source 32. The voltage provided by source 32 is initially adjusted so as to be proportional to the maximum permissible gas generator speed. However, since this maximum speed and the slope of the $N_g$ vs. power remaining curve vary with compressor inlet temperature, T2 compensation should be provided in the $N_g$ channel. This is done in the same manner as described above in relation to the T5 channel. As a result, the output from circuit 30 is zero at maximum permissible $N_g$ and increases as actual $N_g$ decreases below its upper limit. The $N_g$ difference voltage from circuit 30 is applied to multiplier 34 where it is multiplied by the T2 signal to change its slope in accordance with changes in T2.

The instrument converts each of the three parameters, T5, $N_g$ and torque, into terms of percent power remaining. Previously plotted engine data is utilized for this purpose. However, since the conversion of these factors to terms of power is a simple function, this is accomplished merely by varying the proportionality of amplifiers 36, 38, and 40 which respectively have the modified T5, torque and $N_g$ difference signals applied thereto from multipliers 18 and 34 and difference circuit 22. The outputs of the three amplifiers, which are any well known type of amplifier which will produce a relatively negative output voltage, are respectively applied to trim-adjust circuits 42, 44 and 46. As can be seen from trim-adjust circuit 42, a schematic view of which is shown, the proportional signals are each offset by trim voltages so that the sum of the signal and offset is zero volts at 50% power remaining and a maximum voltage when the parameter is at its limiting value. That is, when the sensed parameter is at its maximum permissible value, there is no input to its associated amplifier from the difference circuit and accordingly no output from the amplifier. Considering the T5 channel, the voltage on the wiper arm of potentiometer 48 appears at the output of trim adjust circuit 42 when there is no output from amplifier 36. This output voltage, when applied through a selector circuit 50, is enough to drive the indicating meter to full scale deflection. For conditions where there is an error voltage from difference circuit 12, amplifier 36 will provide a relatively negative output voltage. This negative voltage will be subtracted from the trim voltage thereby causing the output of the trim adjust circuit to decrease as the value of the limiting parameter, in this case T5, decreases causing an increase in the difference voltage applied to amplifier 36.

Figure 3:
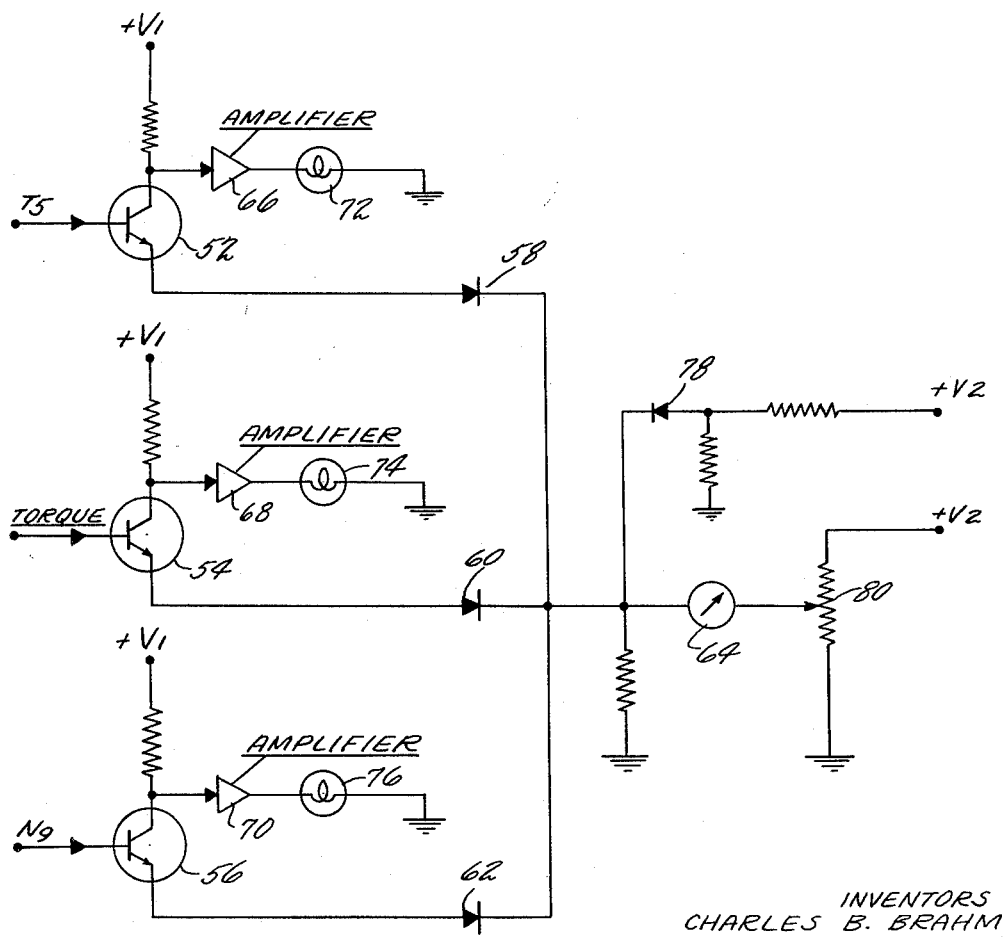
FIGURE 3 is a schematic drawing of the selector circuit utilized in the block diagram of FIGURE 2.

The outputs of the three tri-adjust circuits are applied to a power limit selector circuit 50. Circuit 50 functions as a MOST gate such that the input having the greatest magnitude is passed to the indicator circuit. As can be seen from FIGURE 3, the three input signals are applied to the base electrodes of respective emitter followers 52, 54 and 56. The MOST gate operates such that it open-circuits the two emitter followers having the lower base input voltages. This may be understood when it is realized that the base voltages on transistors 52, 54 and 56 will appear, less the contact potential of approximately 0.5 volt, on the emitters of these transistors. Consequently, these voltages will also appear on the anodes of diodes 58, 60 and 62. The diodes will instantaneously be forward biased and will conduct. The anode voltages of the diodes, again less the contact potential of 0.5 volt, will therefore be applied to the common junction between the cathodes of the diodes. This common junction point will assume a potential equal to the highest voltage applied thereto. Consequently, the two diodes with the lesser anode potentials, corresponding to the two smaller transistor base input signals, will be reverse biased. Reverse biasing of the diodes will obviously prevent current flow through their associated transistors. Should the input signal to the base of one of the "cut-off" transistors increase above that of the conducting transistor, its associated diode will again become forward biased raising the potential of the common cathode junction and reverse biasing the diode associated with the conducting transistor. Thus, the selector circuit will apply the output of the one of the three sensor channels having the greatest magnitude, which corresponds to the engine parameter nearest its power limiting value, to an indicator meter 64. Connected in the collector electrode circuit of each of the emitter followers 52, 54 and 56 respectively, are amplifiers 66, 68 and 70 which supply bulb current for indicator lamps 72, 74 and 76. These lamps, driven from the collector side of the emitter follower circuits, identify which parameter is closest to its limiting value. In the absence of transistor current the bulb lighting circuits have no drive current. Consequently, only the emitter follower with the greater base input voltage is conducting and so has a current flowing which serves as a signal, by means of a collector resistor, to bias on its associated amplifier and bulb circuit. To provide for temperature compensation for selector diodes 58, 60 and 62, a diode 78 having its cathode connected to the common cathode junction is utilized. The function of this diode is to cause the voltage at the common cathode junction to track the contact potential of any one selector diode as it varies with temperature. Diode 78 also serves as a clamp to prevent meter damage in the negative direction.

The zero percent power remaining level is set up as a reference voltage on one side of meter 64 by adjusting potentiometer 80. Against this reference is compared the limiting parameter signal selected by circuit 50. The difference between the selected signal and the reference voltage will drive the meter movement and will thus position a pointer on the face of the meter against a backdrop of a scale calibrated to indicate percent power remaining.

While a preferred embodiment of our invention has been shown and described, various modifications and substitutions may be made without deviating from the spirit and scope of our invention. For example, for many applications, it is possible to eliminate the torque channel and still have a power remaining computer of sufficient sensitivity and accuracy. Also, it should be understood that, for use with the two movement meter of FIGURE 1, two identical circuits; one for each engine; such as that shown in FIGURE 2 must be utilized. Thus, our invention is described by way of illustration rather than limitation and accordingly it is understood that our invention is to be limited only by the appended claims taken in view of the prior art.

We claim:
1. A power remaining computer for a gas generator having at least one turbine driving a compressor comprising:
    means for sensing a first power limiting operating parameter of the gas generator,
    means responsive to said first parameter sensing means for providing a first signal proportional to power output of the gas generator as a function of said first parameter,
    means for sensing a second power limiting operating parameter of the gas generator,
    means responsive to said second parameter sensing means for providing a second signal proportional to power output of the gas generator as a function of said second parameter,
    means responsive to said first and second power output signals for selecting the one of said signals which corresponds to the operating parameter which is nearest to its power output limiting value, and
    means responsive to said selected power output signal for producing an indication of the remaining power available from the gas generator.

2. The apparatus of claim 1 wherein the selecting means comprises:
   magnitude sensitive means responsive to said power output signals for passing the signal having the greatest magnitude to said means for producing an indication and blocking the other power output signal from said indicating means.

3. The apparatus of claim 2 wherein the means for producing an indication of power remaining comprises:
   means for providing a reference signal proportional to maximum power output of the gas generator,
   means for comparing the reference and selected signals to produce a difference signal indicative of power remaining,
   an indicating instrument, and
   means for applying said difference signal to said instrument.

4. The apparatus of claim 3 wherein said magnitude sensitive means further comprises:
   means for indicating which of said power output signals is being passed to the comparing means.

5. The apparatus of claim 4 wherein the means for providing a first signal proportional to power output comprises:
   means for producing a second reference signal proportional to the maximum limit of the sensed parameter,
   means for comparing said second reference signal with the output of the first parameter sensing means to produce a second difference signal, and
   means for converting said second difference signal into a signal proportional to power output as a function of the sensed parameter.

6. The apparatus of claim 5 wherein the means for converting the second difference signal into a signal proportional to power output comprises:
   means for converting said second difference signal into a signal inversely proportional to power remaining,
   means for generating a third reference signal indicative of maximum power output, and
   means for subtracting said signal inversely proportional to power remaining from said third reference signal to produce a signal directly proportional to power as a function of the sensed parameter.

7. The apparatus of claim 6 wherein the means for providing a second signal proportional to power output comprises:
   means for producing a fourth reference signal proportional to the maximum limit of the sensed parameter,
   means for comparing said fourth reference signal with the output of the second parameter means to produce a third difference signal,
   means for converting said third difference signal into a second signal inversely proportional to power remaining,
   means for generating a fifth reference signal indicative of maximum power output, and
   means for subtracting said second signal inversely proportional to power remaining from said fifth reference signal to produce a second signal directly proportional to power as a function of the sensed parameter.

8. The apparatus of claim 7 wherein the first sensing means comprises:
   temperature responsive means for sensing the temperature of the discharge from the gas generator.

9. The apparatus of claim 8 wherein the second sensing means comprises:
   speed responive means for sensing the speed of the gas generator.

10. The apparatus of claim 9 further comprising:
    means for sensing the temperature upstream of the compressor of the gas generator, and
    means responsive to said upstream temperature sensing means for modifying said second and third difference signals in accordance with the upstream temperature.

11. The apparatus of claim 10 further comprising:
    second means responsive to said upstream temperature sensing means for varying said second and fourth reference signals in accordance with upstream temperature.

12. A power remaining computer for a free turbine engine, said engine including a gas generator having a compressor and a free turbine operatively connected to a load and being driven by the output from said gas generator, said computer comprising:
    means for sensing the temperature of the discharge from the gas generator and for generating a signal commensurate therewith,
    means responsive to said signal commensurate with discharge temperature for generating a signal proportional to remaining power available from the engine as a funciton of gas generator discharge temperature,
    means for sensing the speed of the gas generator and for generating a signal commensurate therewith,
    means responsive to said signal commensurate with gas generator speed for generating a signal proportional to remaining power available from the engine as a function of gas generator speed,
    means for selecting the one of said signals commensurate with power remaining indicative of the least power remaining, and
    means responsive to said selected signal for providing an indication of power remaining.

13. The apparatus of claim 12 wherein said means for generating signals proportional to remaining power each comprises:
    means for generating a reference signal proportional to the limiting value of the sensed parameter,
    means responsive to said reference signal and a signal commensurate with the value of the corresponding sensed parameter for producing a signal indicative of the proximity of the sensed parameter to its limiting value, and
    means responsive to said signal indicative of the proximity of the sensed parameter to its limiting value for producing a signal proportional to remaining power available from the engine as a function of the sensed parameter.

14. The apparatus of claim 13 wherein the selecting means comprises:
    a signal magnitude sensitive switching circuit responsive to said signals proportional to power remaining for passing the one of said signals indicative of least remaining power to the indicating means and for blocking the other two of said signals, and
    second means responsive to the selected signal for providing a visual indication of which of the sensed parameters is limiting available gas generator power.

15. The apparatus of claim 14 further comprising:
    means for sensing the temperature upstream of the compressor of the gas generator and for generating a signal commensurate therewith, and
    means responsive to said signal commensurate with upstream temperature for modifying said signals indicative of the proximity of the sensed parameters to their limiting values in accordance with the upstream temperature.

16. A power remaining computer for a gas generator comprising:
    means for sensing a first power limiting operating parameter of the gas generator and for generating a signal proportional to the instantaneous value thereof,
    means for generating a first reference signal proportional to the limiting value of the sensed first operating parameter,
    means responsive to said first reference and first operating parameter signals for producing a first signal commensurate with remaining power available from the gas generator as a function of the first parameter, means for sensing a second power limiting operating parameter of the gas generator and for generating a signal proportional to the instantaneous value thereof, means for generating a second reference signal proportional to the limiting value of the sensed second parameter, means responsive to said second reference and second operating parameter signals for producing a second signal commensurate with remaining power available from the gas generator as a function of the second parameter, selector means responsive to said first and second signals commensurate with power remaining for passing the one of said signals indicative of the least amount of power remaining, and means responsive to the signal passed by said selector means for providing an indication of remaining power available from the gas generator.

17. The apparatus of claim 16 wherein the means for producing the first and second signals commensurate with power remaining each comprises:

means responsive to the reference and operating parameter signals for producing a signal proportional to the proximity of the operating parameter to its limiting value, and means responsive to said signal proportional to the proximity of the operating parameter to its limiting value for producing a signal commensurate with remaining power available from the gas generator as a function of the operating parameter.

18. A power remaining computer for a gas generator comprising:

means for sensing a first power limiting operating parameter of the gas generator and for generating a signal proportional to the instantaneous value thereof, means for generating a first reference signal proportional to the limiting value of the sensed first operating parameter, means responsive to said first reference and first operating parameter signals for producing a first signal indicative of the proximity of the first operating parameter to its limiting value, means for sensing a second power limiting operating parameter of the gas generator and for generating a signal proportional to the instantaneous value thereof, means for generating a second reference signal proportional to the limiting value of the sensed second operating parameter, means responsive to said second reference and second operating parameter signals for producing a second signal indicative of the proximity of the second operating parameter to its limiting value, selector means responsive to said first and second signals indicative of the proximity of the first and second operating parameters to their limiting values for passing the one of said signals corresponding to the parameter which is closest to its limiting value, and means responsive to the signal passed by said selector means for providing an indication of remaining power available from the gas generator.

19. The apparatus of claim 15 further comprising:

means for sensing the torque developed by the free turbine and for generating a signal commensurate therewith, means responsive to said torque sensing means for generating a signal proportional to remaining power available from the engine as a function of torque, and means for applying said signal commensurate with remaining power as a function of torque to said selecting means.

References Cited by the Examiner
UNITED STATES PATENTS 2,941,399  6/60  Bersinger _____ 73—116
3,104,524  9/63  Flanders _____ 60—39.28 X RICHARD C. QUEISSER, *Primary Examiner.*

DAVID SCHONBERG, *Examiner.*